US008284751B2

(12) United States Patent
Kock

(10) Patent No.: US 8,284,751 B2
(45) Date of Patent: Oct. 9, 2012

(54) COMMUNICATIONS SYSTEM FOR AIRPORT SIGNALING DEVICES

(75) Inventor: Klaus Kock, Erlangen (DE)

(73) Assignee: ADB BVBA, Zaventem (BE)

( * ) Notice: Subject to any disclaimer, the term of this patent is extended or adjusted under 35 U.S.C. 154(b) by 2295 days.

(21) Appl. No.: 10/521,905

(22) PCT Filed: Jul. 17, 2003

(86) PCT No.: PCT/DE03/02411

§ 371 (c)(1),
(2), (4) Date: Jan. 20, 2005

(87) PCT Pub. No.: WO2004/017682

PCT Pub. Date: Feb. 26, 2004

(65) Prior Publication Data

US 2005/0253929 A1 Nov. 17, 2005

(30) Foreign Application Priority Data

Jul. 23, 2002 (DE) .................................. 102 33 437

(51) Int. Cl.
*H04B 7/212* (2006.01)

(52) U.S. Cl. ..................... 370/347; 455/431; 455/456.6; 340/642; 340/953

(58) Field of Classification Search .................. 340/642, 340/953; 455/431, 456.6
See application file for complete search history.

(56) References Cited

U.S. PATENT DOCUMENTS

| | | | | |
|---|---|---|---|---|
| 4,951,046 | A * | 8/1990 | Lambert et al. | 340/953 |
| 5,243,340 | A * | 9/1993 | Norman et al. | 340/953 |
| 5,291,299 | A * | 3/1994 | Karna | 315/323 |
| 5,359,325 | A * | 10/1994 | Ford et al. | 340/953 |
| 5,426,429 | A * | 6/1995 | Norman et al. | 340/953 |
| 6,282,417 | B1 * | 8/2001 | Ward | 455/431 |
| 6,573,840 | B1 * | 6/2003 | Norman et al. | 340/953 |
| 2003/0160707 | A1 * | 8/2003 | Norman et al. | 340/953 |

FOREIGN PATENT DOCUMENTS

| | | | |
|---|---|---|---|
| DE | 42 32 618 | A1 | 3/1994 |
| DE | 298 23 494 | U1 | 9/1999 |
| WO | WO 90/04242 | A1 | 4/1990 |
| WO | WO 95/24820 | A1 | 9/1995 |
| WO | WO 98/02859 | A1 | 1/1998 |
| WO | WO 9954854 | A2 * | 10/1999 |

* cited by examiner

*Primary Examiner* — Rafael Pérez-Gutiérrez
*Assistant Examiner* — Liton Miah
(74) *Attorney, Agent, or Firm* — Tucker Ellis LLP

(57) ABSTRACT

The invention relates to a communications system for airport signalling devices. In said system, the series or parallel circuits used for supplying electricity to the signalling devices are used for the communication between a control device, a central communication device and signalling devices. The OFDM method is preferably used to transmit signals and decentralised communications devices, which are assigned to the signalling devices and preferably have elements for preparing the signals, are dynamically configured in an adaptive manner during the active operation of the system by a central communication device.

20 Claims, 1 Drawing Sheet

COMMUNICATIONS SYSTEM FOR AIRPORT SIGNALING DEVICES

CROSS REFERENCE TO RELATED APPLICATIONS

This application is the U.S. National Stage of International Application No. PCT/DE2003/002411, filed Jul. 17, 2003 and claims the benefit thereof. The International Application claims the benefits of German application No. 10233437.4 filed Jul. 23, 2002, both applications are incorporated by reference herein in their entirety.

FIELD OF THE INVENTION

The invention relates to a communications system for signaling apparatuses at an airport, with the communications system having, as system components at least one central communications apparatus and a number of signaling apparatuses, with the communication between the system components taking place via one or more circuits, by means of which the signaling apparatuses are supplied with power.

BACKGROUND OF THE INVENTION

There are a large number of signaling apparatuses at airports, such as lighting devices, which may be located in particular on or in the vicinity of taxiways, ramps, taxiways or runways, or else, for example, on buildings such as hangers, on the tower or on other facilities. Signaling apparatuses may also include, for example, radar devices or radio beacons.

Airport lighting systems are currently known which are used essentially for monitoring the lamp function of the individual airport lights and in this case replace simple open-loop and closed-loop control signals. The power range of known systems such as these is restricted considerably, primarily as a result of serious interference factors. For example, the electrical characteristics of the cables that are used for communication change as a result of the varying moisture in the ground and as a result of aging phenomena, as well as a result of the requirements for airfield operation becoming particularly stringent. Particularly in the case of airport operation, interference occurs to an unusual extent, severity and with an unusual irregularity as a result of other systems. Interference influences are caused, for example, by on-board electrical power supply systems, on-board radars, stationary radars, radio links or other mobile radio systems, network command receivers, power and control cables located parallel to one another, reinforcing iron in ground fittings, fuel lines installed in the surfaces, and as a result of static charges which are caused by flying operations.

WO 95/24820 describes a communication system of the type mentioned initially for a series circuit, with communication taking place only in narrowly delineated time periods, with the delineation of the time periods, with the time periods being delineated as a function of the frequency of the circuit, in order to avoid interference influences from harmonics. The synchronization between the time intervals for communication and the frequency of the circuit is in this case relatively complex and extends.

SUMMARY OF THE INVENTION

The object of the invention is to provide a communications system of the type mentioned initially which takes account in a particular manner of the conditions of flying operations and significantly reduces not only the interference susceptibility, which is primarily a result of the application, and the complexity of existing airport lighting systems, but also significantly improves the communication in the airport ground area, with little installation complexity.

According to the invention, this object is achieved in that the communication between the system components is distributed over a number of frequency bands in a limited frequency range, and takes place via one or more circuits, by means of which the signaling apparatuses are supplied with power. The use according to the invention of a number of frequency bands in the sense of frequency multiplexing makes the communications system particularly robust against, in particular, pulsed interference of high intensity. There is no need for complex, broadband channel equalization since each frequency band can be considered as a simple attenuator with fixed attenuation and a constant phase. The robustness of the communications system is thus significantly improved, and the achievable data transmission rates are considerably increased.

The communication is advantageously subdivided into time slices. Such time-division multiplexing in conjunction with the use according to the invention of a number of frequency bands effectively minimizes problems of crosstalk between individual communication channels.

A frequency range between about 10 kHz and about 150 kHz is advantageously used for communication. Contrary to expectations, this frequency range has been found to be particularly advantageous with respect to the frequency spectrum of interfering external systems in the airport area.

The advantages according to the invention as described above can be increased even further by using up to ten different frequency bands and/or up to five different time slices for communication.

The OFDM multicarrier method is advantageously used for communication, allowing particularly fast, reliable communication with a high throughput rate. The insensitivity of the communications system for interference is thus increased further, allowing data transmission rates of more than 40 kbaud, and up to at least 1.5 Mbaud.

The central communication apparatus is advantageously connected to a number of signaling apparatuses via a series circuit. The use of series circuits is advantageous in terms of the wiring complexity.

The central communication apparatus is advantageously connected to a number of signaling apparatuses via a parallel circuit, thus making it possible to save assemblies in the signaling apparatus, for example in particular lamp transformers.

At least one decentralized communications apparatus is advantageously allocated to at least one signaling apparatus and can be used to measure the reception quality of communication signals. This makes it possible to detect and correct for changing electrical characteristics and, in particular, also locally occurring interference influences.

Such interference influences and changing electrical characteristics are advantageously taken into account by at least one decentralized communication apparatus, which can be used to amplify communication signals, being allocated to at least one signal apparatus. The positioning of the signaling directions is thus also no longer dependent on the length of the transmission path.

The decentralized communication apparatuses advantageously form an adaptive system. This avoids the failure of one or more decentralized communication devices leading to the failure of a larger subsystem, while ensuring that the communication quality and robustness of the system is ensured in all parts, and very largely at all times, despite the possibility of a failure of one or more decentralized communication devices.

Communication paths are advantageously determined dynamically with the assistance of the measured reception quality. This results in a network management system which operates in a highly dynamic form, with optimum communication paths to the decentralized communication apparatuses always being determined on the basis of existing communication data, in particular by measurement of the reception quality. The network management system is in this case primarily distinguished by its good adaptability and extremely fast reaction times.

The invention will be explained in more detail in the following text using exemplary embodiments and with reference to the drawings, in which:

DETAILED DESCRIPTION OF THE INVENTION

Figure 1:
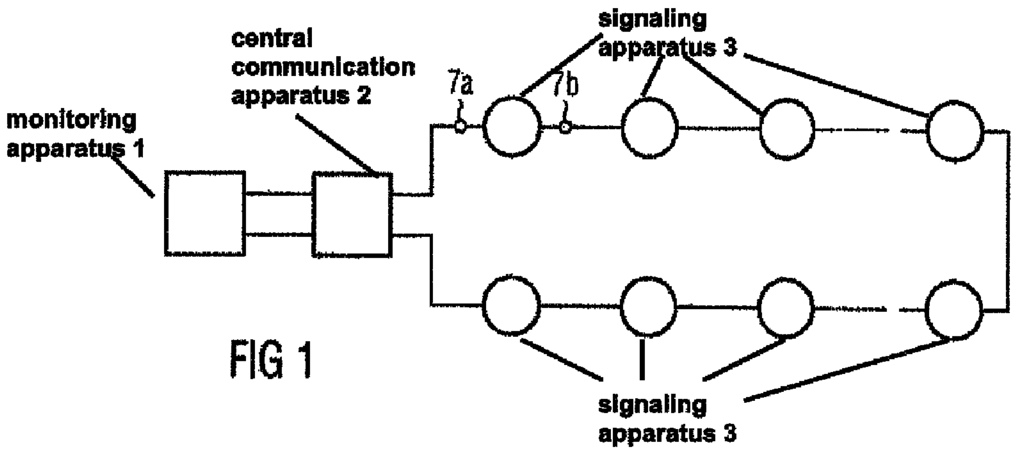
FIG. 1 shows a simplified example of a communications system according to the invention with a series circuit.

FIG. 1 shows, schematically, the example of an airport lighting system in which a number of signaling apparatuses 3 which, for example, are in the form of airport lights, are connected via a series circuit to a central communication apparatus 2 and to a monitoring apparatus 1. The series circuit is in this case used not only for communication between the monitoring apparatus 1, the central communication apparatus 2 and the signaling apparatuses 3, but also for supplying power to the signaling apparatuses 3.

Figure 2:
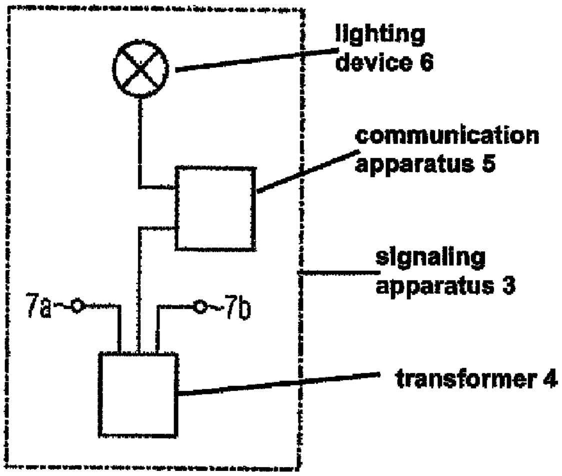
FIG. 2 shows a refinement of a signaling apparatus.

The signaling apparatuses 3 may be not only lighting devices, as illustrated in FIG. 2, but, for example, also direction sensors and sensors for aircraft detection and aircraft classification. Signaling apparatuses 3 also include, for example, devices for detection of the wind direction and intensity and their signaling, as well as other types of detection and signaling apparatuses for meteorological data. The expression also includes sensors for detection of gas and water in cable ducts, as well as visual detection devices, such as video cameras, for monitoring the approach and climb-out, take off and landing runways and taxiways, in particular including the stop bars as signaling apparatuses 3 in the sense of the invention.

FIG. 2 shows one embodiment of the signaling apparatus 3. In this case, the connections 7*a* and 7*b* are used to provide the connection for a circuit which is used for power supply and communication, as is illustrated by way of example in FIG. 1 and FIG. 3. A lamp transformer 4 is required for operation in series circuits. The decentralized communication apparatus 5 for the signaling apparatus 3 is used to switch the lighting device 6 on and off, to generate blinking or flashing signals for the lighting device 6, and it also provides data about the status of the lighting device 6.

Figure 3:
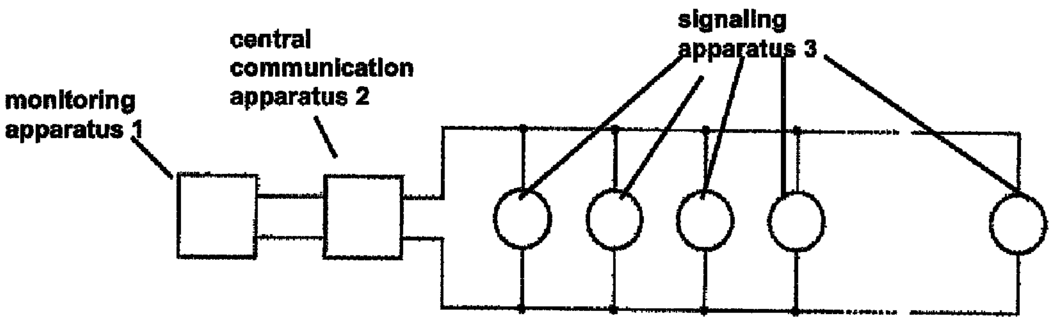
FIG. 3 shows a simplified example of a communications system according to the invention with a parallel circuit.

FIG. 3 shows a communications system according to the invention in which the monitoring apparatus 1 as well as the central communication apparatus 2 are connected to the signal apparatuses 3 by means of a parallel circuit. If the signaling apparatuses 3 are supplied with electrical power by means of a parallel circuit, then there is no need for each signaling apparatus 3 to have its own lamp transformer 4 (FIG. 2). This is particularly advantageous since lamp transformers 4 such as these are optimized for operation in electrical power supply systems which are used exclusively for power transmission, and in which the attenuation of the communication signal in the radio-frequency range is thus severe.

It is also possible to construct a communications system according to the invention to be more complex than that illustrated in FIGS. 1 and 3. For example, a monitoring apparatus 1 can also be connected to two or more central communication apparatuses 2. Signaling apparatuses 3 can be connected to a central communication apparatus via at least one series circuit, as is illustrated with FIG. 1, and/or via at least one parallel circuit, as is illustrated in FIG. 3.

The invention will be described in more detail in the following text with reference to FIGS. 1 and 3.

The decentralized communication apparatuses 5 for the signaling apparatuses 3 transmit not only the status of the lighting device 6, that is to say by way of example on, off or defective, but also variables such as the current level or voltage in the system, to the central communication apparatus 2; which, which is in turn connected to the monitoring apparatus 1. The monitoring apparatus 1 for the communications system is, for example, in the form of a computation system and uses the communication apparatuses 2 and 5 to control the signaling apparatuses 3. The communications system according to the invention can also be used in particular for providing the services of a fieldbus to an automation system for the airfield.

The decentralized communication apparatuses 5 for the signaling apparatuses 3 advantageously have so-called repeaters for signal preprocessing. These are adapted in a highly dynamic form by means of the network management. The decentralized communication apparatuses 5 furthermore have means for measurement of the reception quality of information. The information quality determined in this way is signaled, for example periodically and/or when limit values are exceeded, to the central communication apparatus 2. The central communication apparatus 2 therefore always has a map of communication capability of the entire system of the overall system. By evaluating the information quality as signaled from the individual signaling apparatuses 3, the central communication apparatus 2 is always able to optimally configure the overall system dynamically and in real time for each individual transmission process.

The central communication apparatus 2 thus determines which of the decentralized communication apparatuses 5 will be used to amplify the signals being transmitted via the circuit. This therefore always ensures that, on the one hand, an adequate transmission quality is guaranteed in the communications system, that is to say the communication signals are always adequately amplified although, at the same time, the power and communication processes required for this purpose are also at the same time kept to a minimum, that is to say the communication signals are amplified by as small a number of repeaters as possible.

The failure of signaling apparatuses 3 is also signaled by means of the appropriate decentralized communication apparatus 5 to the central communication apparatus 2, which then reconfigures the overall system. Even after the failure of individual signaling apparatuses 3, the overall system is always adapted, until they are brought into use once again, such that the transmission quality from and to all of the system components 1 to 3 is always sufficiently high, and the overall system is optimally configured. To do this, the central communication apparatus 2 always matches the system configuration, that is to say by way of example the. repeater function of individual decentralized communication apparatuses 5, to the current situation, with the signal quality messages of the decentralized communication apparatuses 5 being taken into account.

The central communication apparatus 2 ensures reliable and robust signal propagation in conjunction with the decentralized communication apparatuses 5, and for this purpose carries out an error check as well as a crosstalk check. The capability according to the invention to continuously reconfigure the decentralized communication apparatuses 5 during system operation results in known static repeater systems being replaced by a dynamic and considerably more reliable repeater system.

Information is transmitted to the circuits by means of the OFDM method in a frequency range between about 10 and about 150 kHz using, for example, up to ten different frequency bands and with the assistance of a time-division multiplexing method with, for example, up to five time slices, thus resulting in up to 50 different communication channels.

The communications system may also be designed in such a way that a greater number of time slices and/or frequency bands are used, thus resulting in more than 50 communication channels. Independently of this, or else in addition to it, the frequency range used for communication may be enlarged and/or moved.

The up to ten different frequency bands are used in the form of a frequency-division multiplexing method. The frequency bands may in this case, for example, be formed such that they do not overlap, and it is possible for the frequency ranges of the various frequency bands not to be directly adjacent to one another. This particularly effectively avoids crosstalk problems, and, furthermore, other types of interference can also be counteracted better.

The OFDM method has been found not only to be a highly robust modulation method overall but also, in particular, to be highly resistant to, in particular, pulsed interference signals such as those which occur in airport operation. The modulation method complies with widely differing extremely stringent safety requirements for flying operations. The data transmission rate of the communications system according to the invention in comparison to present-day systems that are used at airports which are used for controlling the lighting systems at airports is increased by a factor of more than four to about 40 Kbaud, and beyond this up to about 1.5 Mbaud.

The invention claimed is:

1. A communications system for signaling apparatuses at an airport, comprising:

at least one central communications apparatus; and a plurality of signaling apparatuses, wherein a communication between the central communications apparatus and the signaling apparatuses is performed via one or more circuits supplying the signal apparatuses with power, and wherein the communication between the central communications apparatus and the signaling apparatuses is performed in a frequency range using a number of frequency bands within the frequency range.

2. The communications system as claimed in patent claim 1, wherein the communication is controlled by a number of time slices.

3. The communications system as claimed in patent claim 2, wherein the frequency range is chosen from the range between 10 kHz and 150 kHz.

4. The communications system as claimed in patent claim 2, wherein up to ten frequency bands are used.

5. The communications system as claimed in patent claim 2, wherein up to five time slices are used.

6. The communications system as claimed in patent claim 2, wherein an OFDM method is used for performing the communication.

7. The communications system as claimed in patent claim 2, wherein the central communications apparatus and the signaling apparatuses are connected via a series circuit.

8. The communications system as claimed in patent claim 1, wherein the frequency range is chosen from the range between 10 kHz and 150 kHz.

9. The communications system as claimed in patent claim 8, wherein up to ten frequency bands are used.

10. The communications system as claimed in patent claim 8, wherein up to five time slices are used.

11. The communications system as claimed in patent claim 8, wherein an OFDM method is used for performing the communication.

12. The communications system as claimed in patent claim 1, wherein up to ten frequency bands are used.

13. The communications system as claimed in patent claim 12, wherein up to five time slices are used.

14. The communications system as claimed in patent claim 1, wherein an OFDM method is used for performing the communication.

15. The communications system as claimed in patent claim 1, wherein the central communications apparatus and the signaling apparatuses are connected via a series circuit.

16. The communications system as claimed in patent claim 1, wherein the central communications apparatus and the signaling apparatuses are connected via a parallel circuit.

17. The communications system as claimed in patent claim 1, wherein at least one decentralized communications apparatus is allocated to at least one signaling apparatus, and wherein the decentralized communications apparatus is configured to measure the reception quality of communications signals.

18. The communications system as claimed in patent claims 17, wherein a communication path between at least two of the system components is determined using the measured reception quality.

19. The communications system as claimed in patent claim 1, wherein at least one decentralized communications apparatus is allocated to at least one signaling apparatus, and wherein the decentralized communications apparatus preprocesses communication signals.

20. The communications system as claimed in patent claim 1, further comprising decentralized communication apparatuses forming an adaptive system.

* * * * *